US012711475B2

(12) United States Patent
Chinnappan et al.

(10) Patent No.: US 12,711,475 B2
(45) Date of Patent: Aug. 18, 2026

(54) REAL TIME CROSS-MATCHING DATA

(71) Applicant: Visa International Service Association, San Francisco, CA (US)

(72) Inventors: Raman Chinnappan, Foster City, CA (US); Raja Veeramani, Foster City, CA (US); Guyon Krug, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 204 days.

(21) Appl. No.: 18/477,085

(22) Filed: Sep. 28, 2023

(65) Prior Publication Data

US 2024/0037521 A1 Feb. 1, 2024

Related U.S. Application Data

(62) Division of application No. 16/633,907, filed as application No. PCT/US2017/043697 on Jul. 25, 2017, now Pat. No. 11,810,084.

(51) Int. Cl.

| | |
|---|---|
| ***G06Q 40/00*** | (2023.01) |
| ***G06Q 20/10*** | (2012.01) |
| ***G06Q 20/38*** | (2012.01) |
| ***G06Q 30/0234*** | (2023.01) |

(52) U.S. Cl.

CPC .......... *G06Q 20/102* (2013.01); *G06Q 20/38* (2013.01); *G06Q 30/0234* (2013.01)

(58) Field of Classification Search

CPC .... G06Q 20/102; G06Q 20/38; G06Q 20/388; G06Q 30/0234; G06Q 30/0226

See application file for complete search history.

(56) References Cited

U.S. PATENT DOCUMENTS

| | | | | |
|---|---|---|---|---|
| 5,748,920 | A * | 5/1998 | Mills | G06F 3/14 710/310 |
| 8,606,602 | B2 | 12/2013 | Prange | |
| 10,091,544 | B1 | 10/2018 | Poffenberger | |
| 10,770,114 | B2 | 9/2020 | Shah | |

(Continued)

FOREIGN PATENT DOCUMENTS

| | | | |
|---|---|---|---|
| CN | 103337030 | A | 10/2013 |
| NZ | 622239 | A * | 3/2015 |
| WO | 2019022716 | A1 | 1/2019 |

OTHER PUBLICATIONS

Lott, David (Improving Customer Authentication, Retail Payments Risk Forum Working Paper Federal Reserve Bank of Atlanta, https://www.atlantafed.org/-/media/documents/rprf/rprf_pubs/improving-customer-authentication.pdf Apr. 2015) (Year: 2015).*

(Continued)

*Primary Examiner* — Mark H Gaw

(74) *Attorney, Agent, or Firm* — K&L Gates LLP

(57) ABSTRACT

When a merchant fails to provide payment service details, a system matches in real time information from a data processor with data from the payment service to allow matching a request from the payment system to a particular transaction. The matching system may use high speed buffers and hardware logic to rapidly match related data from different sources at speeds of thousands a second or more. This allows characterization of the transaction for recognition of current offers applicable to the transaction as well as generation of future offers.

17 Claims, 5 Drawing Sheets

(56) References Cited

U.S. PATENT DOCUMENTS

| | | | | |
|---|---|---|---|---|
| 2002/0111906 | A1 | 8/2002 | Garrison | |
| 2004/0172360 | A1 | 9/2004 | Mabrey et al. | |
| 2005/0075960 | A1* | 4/2005 | Leavitt | G06Q 40/00 705/40 |
| 2005/0203854 | A1 | 9/2005 | Das | |
| 2008/0086413 | A1 | 4/2008 | Malloy et al. | |
| 2011/0251952 | A1 | 10/2011 | Kelly | |
| 2012/0153015 | A1 | 6/2012 | Gomez | |
| 2012/0188442 | A1 | 7/2012 | Kennedy | |
| 2012/0303430 | A1* | 11/2012 | Tiku | G06Q 20/384 705/14.27 |
| 2014/0076963 | A1 | 3/2014 | Gratton | |
| 2014/0189115 | A1 | 7/2014 | Eggert | |
| 2014/0222669 | A1 | 8/2014 | Novak et al. | |
| 2015/0127516 | A1* | 5/2015 | Studnitzer | G06Q 40/06 705/37 |
| 2015/0213029 | A1* | 7/2015 | Skolicki | G06F 16/48 707/749 |
| 2015/0304797 | A1 | 10/2015 | Rhoads | |
| 2016/0142227 | A1 | 5/2016 | Li | |
| 2020/0168253 | A1 | 5/2020 | Shah | |
| 2020/0250185 | A1* | 8/2020 | Anderson | G06F 16/24575 |

OTHER PUBLICATIONS

Lott, Improving Customer Authentication, Retail Payments Risk Forum Working Paper Federal Reserve Bank of Atlanta, https://www.atlantafed.org/-/media/documents/rprf/rprf_pubs/improving-customer-authentication.pdf Apr. 2015) (Year: 2015).

International Search Report and Written Opinion for PCT/US2017/043697, dated Oct. 13, 2017.

Notice of Allowance dated May 5, 2020 for U.S. Appl. No. 16/611,603 (pp. 1-9).

* cited by examiner

REAL TIME CROSS-MATCHING DATA

CROSS-REFERENCE TO RELATED APPLICATIONS

This application is a divisional application claiming priority under 35 U.S.C. § 121 to U.S. patent application Ser. No. 16/633,907, filed Jan. 24, 2020, entitled REAL TIME CROSS-MATCHING DATA, which is a U.S. National Stage Entry under 35 U.S.C. § 371 of International Patent Application No. PCT/US2017/043697, filed on Jul. 25, 2017, entitled REAL TIME CROSS-MATCHING DATA, the entire contents of each of which are incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Different opportunities exist for shoppers to use a payment service, such as Visa Checkout or PayPal, when making a purchase transaction. However, in some cases the merchant may not include the necessary coding to identify that the shopper used that particular payment service. When this happens, the shopper may not receive awards or credits that become available through use of the payment service. The impact may be compounded when a card issuer has arrangements with the payment service for additional values when using that issuer's card on the payment service.

SUMMARY

In an embodiment, a system receives, in real time, data from both a transaction processor and a payment service to match a payment requested by the payment service to a transaction processed by a merchant. A real time matching system uses specialized hardware including high speed buffers and first in first out (FIFO) memories to facilitate the process. The matching process in real time allows statement credits or other offers to be presented in a timely fashion for the shopper/consumer to associate the purchase with the action.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Security concerns for both storefront and e-commerce transactions have increased in recent years due to hacking, identity theft, private data abuses, and others. The desire to protect personal information that may have been stored at a merchant with or without the knowledge of owner has led to the use of payment services with tokenized credentials instead of primary account financial instruments. Often, when using payment service, much of the user's personal information is hidden from a merchant, including the user's primary account number (PAN) through the use of the token. The token looks and acts like a credit or debit card number to the merchant but has limited or no functionality outside the environment for which it was generated. The PAN to which the token is associated is known to a back end-processing service and/or the actual card issuer.

A payment service may manage tokens, as well as actual card data, on behalf of a user. In addition to offering, in many cases, the advantage of increased security for transactions, the use of a payment service may have awards and offers that benefit a user financially. These benefits may include discounts on current purchases, accumulation of award points, and discounts on future purchases, and others. The availability of these benefits is contingent on the user getting credit for making transactions using the payment service. The data submitted by a merchant with a transaction may have a field for identifying any payment service that was used during the transaction, and the use of that field virtually guarantees that the user will have that transaction associated with his or her payment service account.

However, not all merchants populate the payment service field when submitting a transaction for processing, often due to programming constraints at its backend. In other cases, an intermediate processor, such as an acquirer, may not forward this data to a processor or token service provider. This results in the user not receiving the benefit that is available through use of the payment service. This undesired effect is exacerbated when discounts or offers may be available as a transaction is processed, but due to the lack of matching, these instant benefits are lost even if a match can be made later, such as when a monthly statement is prepared. Previously, there was no technical solution to the lack of availability of a payment service identifier in a transaction record.

Figure 1:
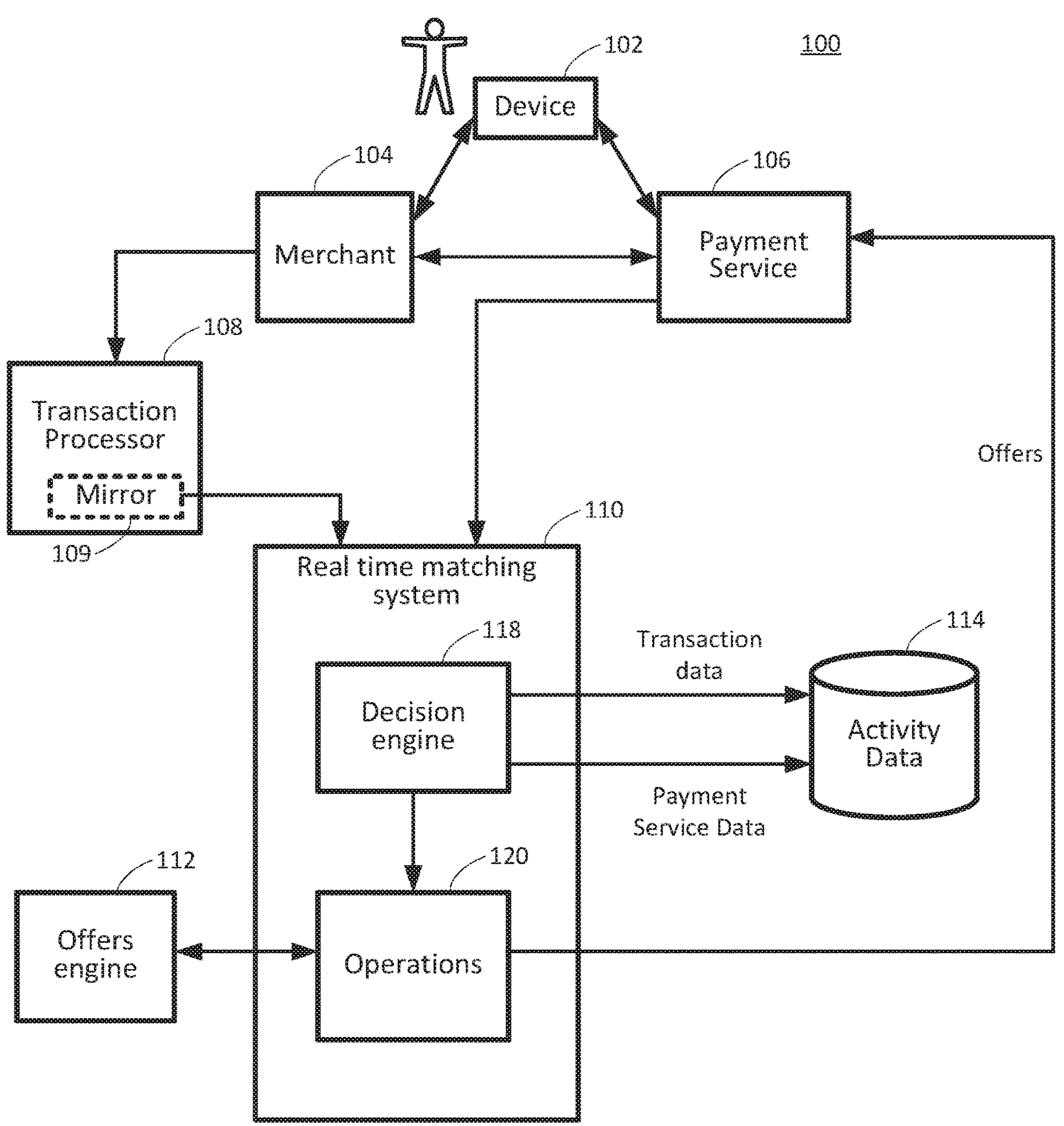
FIG. 1 is a block diagram of a system for real time cross-matching data.

FIG. 1 is a block diagram showing elements of a system 100 supporting real time cross matching of data, in particular, real time matching of data from real time data systems involved in different aspects of transaction processing. A user device 102 may be in communication with both a merchant 104 and a payment service 106. The user device 102 may be any of a number of devices capable of supporting browser-based or application-based sessions with the merchant 104, the payment service 106, or both. These devices may include, without limitation, a desktop computer, a laptop computer, a kiosk, a smart phone, or a tablet. The merchant 104 may be any provider of goods or services that can be sold or contracted via an online transaction and which supports the payment service 106. The merchant 104 may use a server or servers to remain in communication with the user device 102. For example, the merchant 104 may use a three-tier architecture having a web frontend, a backend server, and a database supporting interactions with the user device 102. In an embodiment, the merchant 104 may send transaction requests to a transaction processor 108.

The transaction processor 108 may be an entity such as acquirer, a token service provider, an issuer, or another intermediary in the transaction approval and clearing process. As an example, the transaction processor 108 may be the VisaNet Integrated Payment System (VIP). Among its standard services, the transaction processor 108 may support an authorization service through which an issuer (not depicted) may approve or decline an individual transaction. The transaction processor 108 may also provide clearing and settlement services including sending transaction information to issuers for posting to a cardholder account as well as sending data received from issuers to acquirers for crediting a merchant account. The transaction processor 108 may be embodied in a computing system that may be modified to provide data to a real time matching system 110. In an embodiment, the transaction processor 108 may be modified to include a mirror function 109 that provides a real time data feed to the real time matching system 110. The transaction processor 108 may provide, in real time, datasets containing records from transactions to a real time matching system 110 as described more below. A dataset may include transactions over a certain range of time, such a minute, or may include a single record with data about one transaction.

The payment service 106 may be a service that is subscribed to by the user and which operates on the user's behalf to enter customer data into a web form. For example, the payment service 106 may enter name and shipping information into the appropriate fields of the merchant's order page. The payment service 106 may also store payment instrument data, such as credit card PAN information. In an embodiment, the payment instrument data may be abstracted to a digital token that is substituted for actual credit or debit card information. The use of tokens helps to ensure that a user's actual card information is protected from exposure should a merchant or other partner be hacked. Tokens may be generated for use only by certain merchants or with other restrictions, such as a separate login or authentication, that prevent use of the token by an actor that is not in possession of additional authentication information. In some cases, a biometric marker such as a fingerprint, may be used as an additional authentication element.

The payment service 106 may appear on the user device 102 as an icon on a checkout page of the merchant 104. The user may select the icon to access the payment service via a login process. The payment service 106 may interact with the merchant checkout page to enter personal information, such as shipping address, and either a card number (PAN) or a tokenized card number. The payment service 106 may also provide access to discounts and other promotions, either related directly to the current offer, e.g., free shipping, or to a future purchase, e.g., 10% off a subsequent purchase.

There is an opportunity for the payment service 106 to reinforce its value when feedback on offers and promotions is provided in real time. That is, an indication as to an award may be displayed on the user device 102 while the user is still engaged with the merchant 104 during the current transaction, in contrast to later receiving an email or other post-transaction notice. To enable such real-time communication, the merchant 104 may optionally add data indicating that a payment service 106 was used to complete the transaction and if so, which payment service. However, as discussed above, the merchant 104 may not always include that information when the transaction is passed to the transaction processor 108. In this relatively common case, the opportunity to capitalize on real time offers may be available through the introduction of the real time matching system 110. As described more below, the payment service 106 provides a dataset containing one or more records of transactions initiated through the payment service to the real time matching system 110 for use in identifying the corresponding payment transaction.

The use of the real time matching (RTM) system 110 may assist in situations where a customer uses a payment service 106 but the merchant 104 fails to explicitly identify the payment service in the transaction details. The RTM system 110 may receive real time data from both the transaction processor 108 and the payment service 106 in order to review and match transactions as they occur. The transaction data may be used to identify transactions made via the payment service 106 but which were not explicitly identified in the merchant's transaction record received from the transaction processor 108.

The RTM system 110 may include two principal functions, a decision engine 118, which matches the transaction records and an operations module 120. The decision engine 118 is discussed more below with respect to FIGS. 2 and 3. The operations module 120 may receive transaction data matches from the decision engine 118 and may forward those to a rule-based offers engine 112 for an appropriate offer. The offers engine 112 may select one or more awards based on the transaction type, product(s) purchased, the merchant, the payment service and the customer. The offers engine 112 may have rules that represent various offers, such as cash back on a particular category of purchase, a percent off a current purchase, free shipping, etc. The offers engine 112 may select as many offers as are appropriate or may select the one with the highest current or future value. The operations module 120 may then forward information pertaining to the selected offer to the payment service 106 for display on the user device 102. In addition for some selected functions, such as an instant rebate or cash award, the operations module 120 may also send an appropriate message to a clearinghouse for application of the rebate or cash award. In an embodiment, the clearinghouse may be the transaction processor 108 or a similar entity such as an issuer.

The offers engine 112 may be a service that identifies existing offers for which a current transaction qualifies. In another embodiment, the offers engine 112 may use rules or heuristics to generate an offer that is likely to appeal to the current user. The Visa Offers Platform is an example of an offers engine 112.

The decision engine 118 may also provide data to an activity database 114. The activity database 114 may store both transaction data and payment service data received from the decision engine 118. The activity database 114 may provide long-term data for use in confirmation of matches, data mining, and improvements in the matching process.

Figure 2:
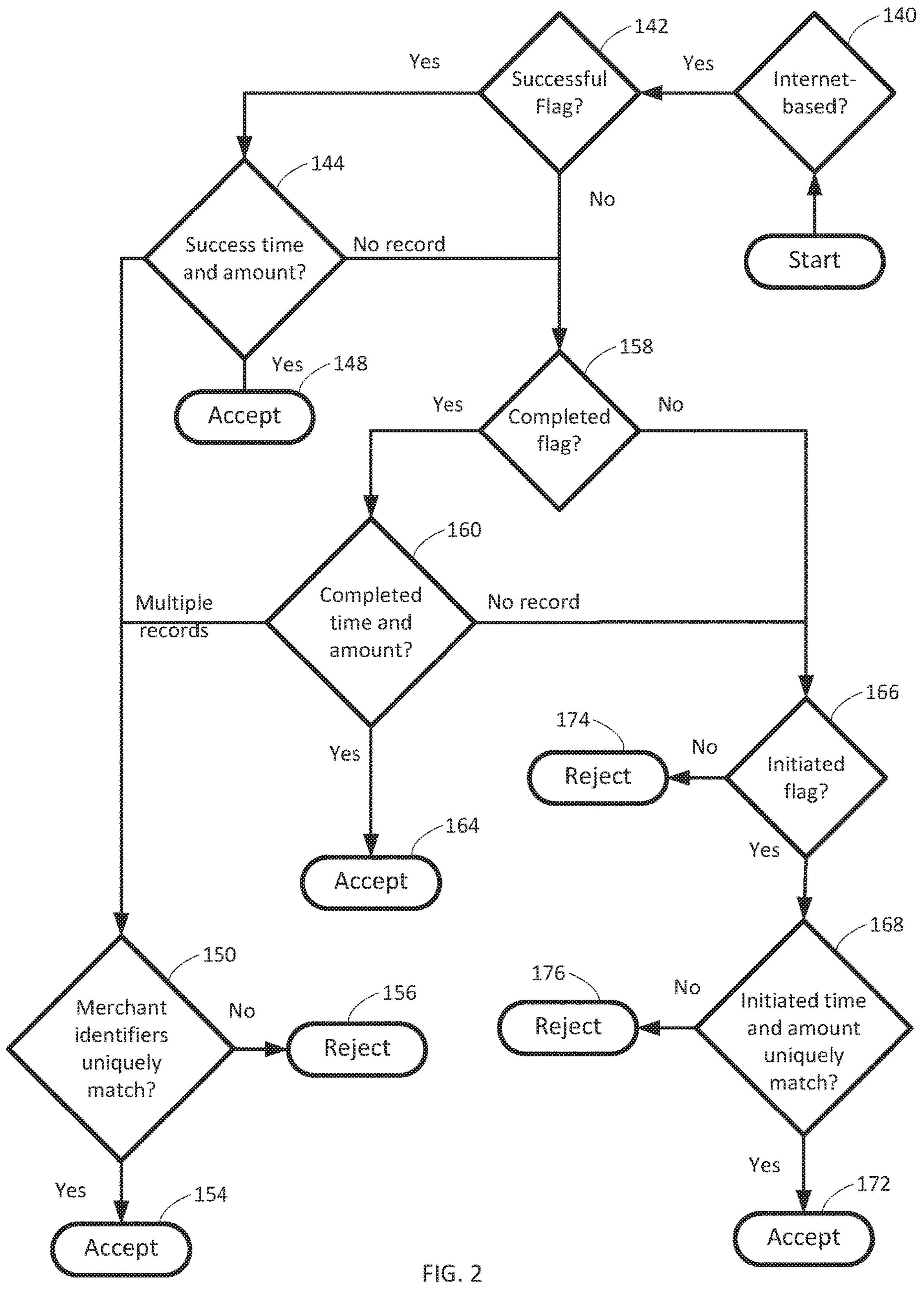
FIG. 2 is an algorithm in the form of a decision tree for use in determining matches of data in the real time system of FIG. 1.

An exemplary algorithm for matching transaction data to payment service data in real time is illustrated in FIG. 2. When active, a notification may be received from the payment service 106 and the matching process begins at block 140 where a transaction from the transaction processor 108 may be evaluated to determine if the transaction is internet-based. If not, execution stops. As discussed more below, a response to a failure to match to a single transaction is not necessarily required. That is, the process operates without an explicit calling entity, so no errors are necessarily raised if a match fails. The RTM 110 may simply move on to another transaction.

The determination of whether a transaction is internet-based may take on a variety of forms. In a simple embodiment, a flag may be review and the flag may indicate the transaction is internet-based. In a more complicated example, the system may use an algorithm to determine if a transaction is internet based. In some embodiments, the algorithm may be a learning algorithm that reviews past transactions and improved the algorithm over time.

Further, the algorithm may be able to adjust in real time as the data reviewed may change. For example, a retailer may change to an more advanced data format which may indicate that a transaction is internet based meaning the review of the transaction should end and that a more complex algorithm may not need to be executed on this specific transaction.

Referring again to block 140, if the transaction is Internet based, execution may continue to determine if a successful flag is set at block 142. The successful flag may indicate that the transaction fully finished. When true, execution may continue at block 144 and an attempt may be made to match the payment service data and transaction data based on the success time and success amount of the transaction. If no match is made, execution may continue at block 158. If a single match is made, the 'yes' branch may be followed to block 148 and the data may be communicated to the operations module 120. If multiple records are matched, execution may continue at block 150.

Returning to block 142, when no successful flag is set, execution may continue at block 158, as also occurs when no record is matched at block 144. If the completed flag is set in the transaction data, the 'yes' branch may be followed to block 160 and the two data are again compared. The completed flag may be set if the transaction was finished at the processor 108 but failed at some point to respond back to the user device 106. If the completed time and completed amount uniquely match the time and amount of the payment service information, then the 'yes' branch may be followed to block 164 and the record is transferred to the operations module 120. If no records match, execution may continue at block 166. If multiple records match, execution may transfer to block 150.

Returning to block 158, when the completed flag is not set, or if no record matches at block 160, execution may continue at block 166 where it is determined if an initiated flag is set. When no initiated flag is set, the process may be halted at block 174. If an initiated flag is set, indicating that some portion of the transaction was undertaken, the 'yes' branch may be taken to block 168. There, if the initiated time and initiated amount uniquely match the payment service data, the 'yes' branch may be taken to block 172 and the data from the record may be communicated to the operations module 120. If the initiated time and amount do not uniquely match the payment service data, the search may end at block 176.

Block 150 may execute when multiple records are matched at either block 144 or block 160. When more than one record matches time and amount values, the merchant identity may be used to further narrow the matching criteria. When the addition of the merchant identifier causes a unique match between records, the execution continues at block 154 and the data is sent to the operations module 120. When no match or multiple matches exist, the 'no' branch is followed to block 156 and the matching process fails.

In an embodiment, when a match is made to a single transaction record, the data may be communicated to the operations module 120. When no match or multiple matches are made, the process may simple end. In another embodiment, a "failed" message may be returned to the payment service 106 to indicate that no matching transaction was found. The payment service 106 may then annotate the unmatched transaction for further processing such as sending a notice to the user indicating that award credit may be available for the given transaction but follow up may be required.

Figure 3:
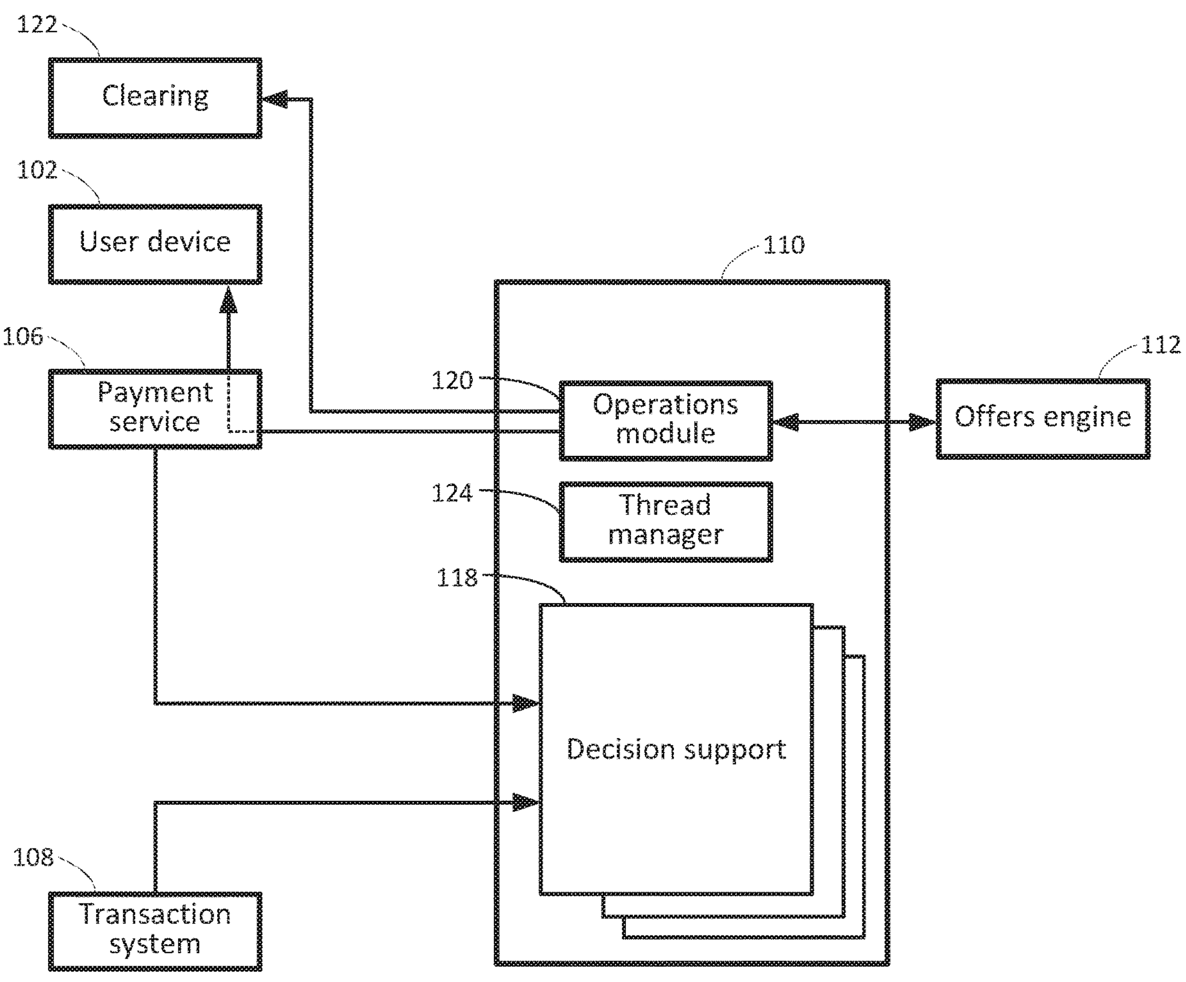
FIG. 3 is a block diagram illustrating a detail of a real time matching engine.

An embodiment of the RTM system 110 is illustrated in block form in FIG. 3. The RTM system 110 may require non-standard hardware that is purpose built and designed for the tasks so that it can accommodate matching hundreds or thousands of payment service transactions a second against tens of thousands of processor transactions a second.

The RTM system 110 may include an operations module 120 that, as described above, may receive match data from the decision engine 118 for multiple purposes. One use of the operations module 120 may be the delivery of transaction data to the offers engine 112 for the purpose of matching the current transaction to one or more corresponding offers or promotions. Another use of the operations module 120 may be the delivery of messages related to the offers or promotions to the payment service 106 and ultimately to the user device 102. In an embodiment, the operations module 120 may generate the user interface code for the user device 102 based on user device information such as operating system, screen size, and any known preferences. In another embodiment, the payment service 106 may receive the offer data in a neutral format and generate the user interface screen information for the user device 102. The operations module 120 may also be responsible for sending a message to a clearinghouse 122 that causes a promotion-related award to be generated, such as a cash-back reward. In an embodiment, the clearinghouse 122 may be the transaction system 108 or a related entity in the settlement process.

The RTM system 110 may also include a thread manager 124 that directs use of multiple instances of a decision engine 118. In one embodiment, the decision engine 118 may be implemented in software. In such an embodiment, one instance of the decision engine 118 may be launched for each payment service transaction for which an associated transaction is to be identified under the control of the thread manager. In this way hundreds or even thousands of decision engine instances may be launched and operated independently.

Figure 4:
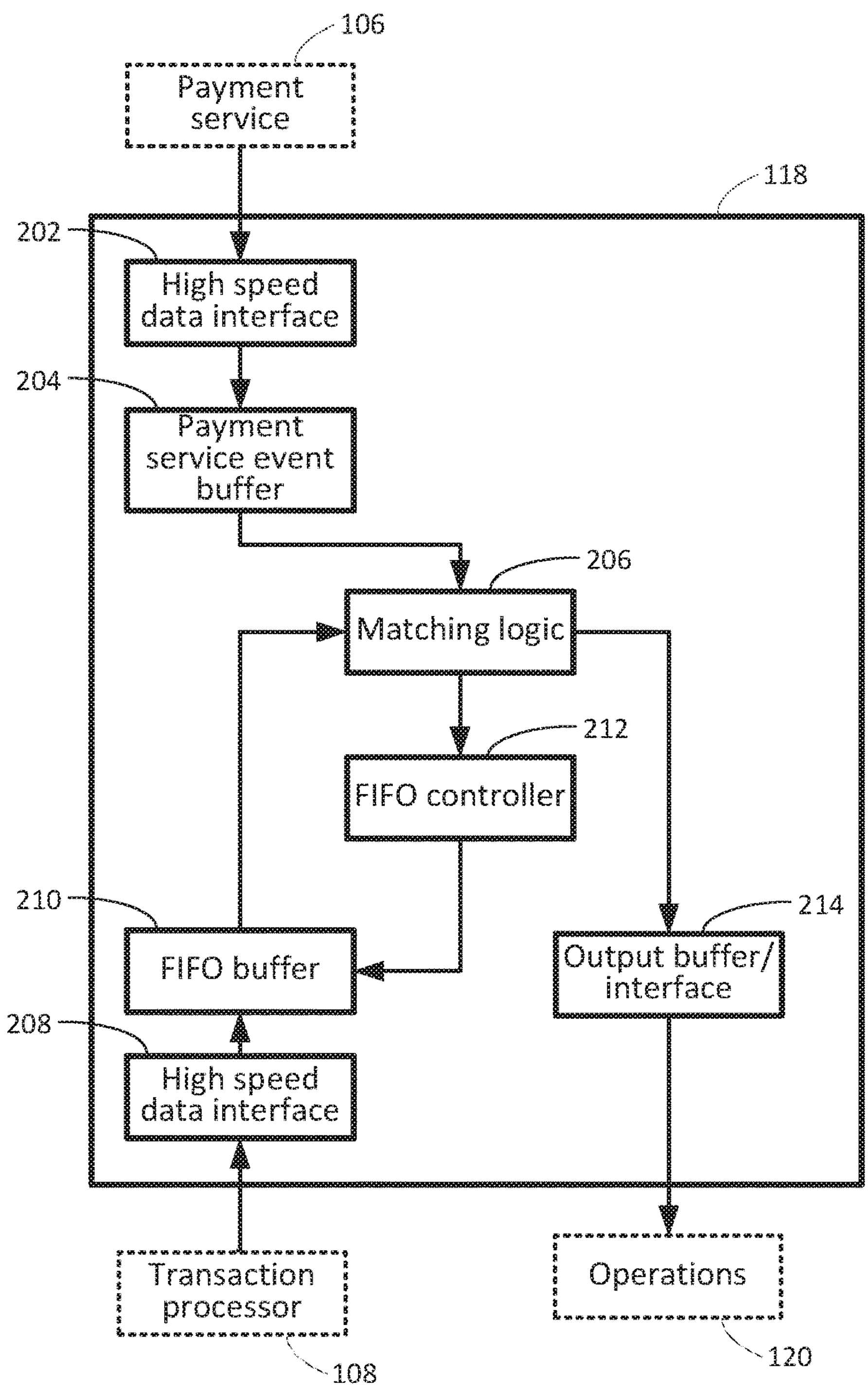
FIG. 4 is a block diagram of a hardware-based implementation of real time cross-matching of data.

Another embodiment of the decision engine 118 may be illustrated in FIG. 4, showing a combination of hardware and software for use in the RTM system 110. In this exemplary embodiment, a transaction to be matched may be received from the payment service 106 at a high speed data interface 202. In various embodiments, the data interface 202 may be an IEEE 1394b standard interface capable of supporting up to 800 Mbps data transfers or a USB 2.0 interface capable of supporting up to 480 Mbps data transfers.

A transaction to be matched may be received from the data interface 202 and stored in a payment service event buffer 204. At nearly an identical time, data from the transaction processor 108 may be streamed via a second high speed data interface 208 to a first-in first-out (FIFO) buffer 210. Data from the FIFO buffer may be analyzed at matching logic 206 using the decision process described above. The FIFO buffer 210 may be controlled by a FIFO controller 212 under the direction of the matching logic 206. The matching logic 206 may be embodied in a programmable logic array or similar hardware logic unit. In another embodiment, the matching logic 206, the FIFO controller 212, or both may be implemented using a processor and memory, such as a single chip computer, known in the industry.

Control of the FIFO buffer 210 by the matching logic 206 (via the FIFO controller 212) may allow selection of data in a time range around the time of the transaction to be matched that is stored in the payment service event buffer 204. For example, the FIFO controller 212 may allow transaction data to fill the buffer 210 and then evaluate whether the data in the buffer 210 is in a time range of interest. If so, the controller 212 may cause the buffer 210 may read out records from the FIFO buffer 210 into the matching logic 206 for a time range of interest for the matching process. The time range may be a span of one second or less.

The matching logic 206 may then pass the matching data to an output buffer/interface 214. The output buffer/interface 214 may pass the match data to the operations module 120 for further processing. In the event of high rates of data traffic, the output buffer/interface 214 may handle queuing, confirmations, and retries, as required. As mentioned previously, the matching logic may be an algorithm and the algorithm may use artificial intelligence to review past transactions to improve the algorithm in the future.

Figure 5:
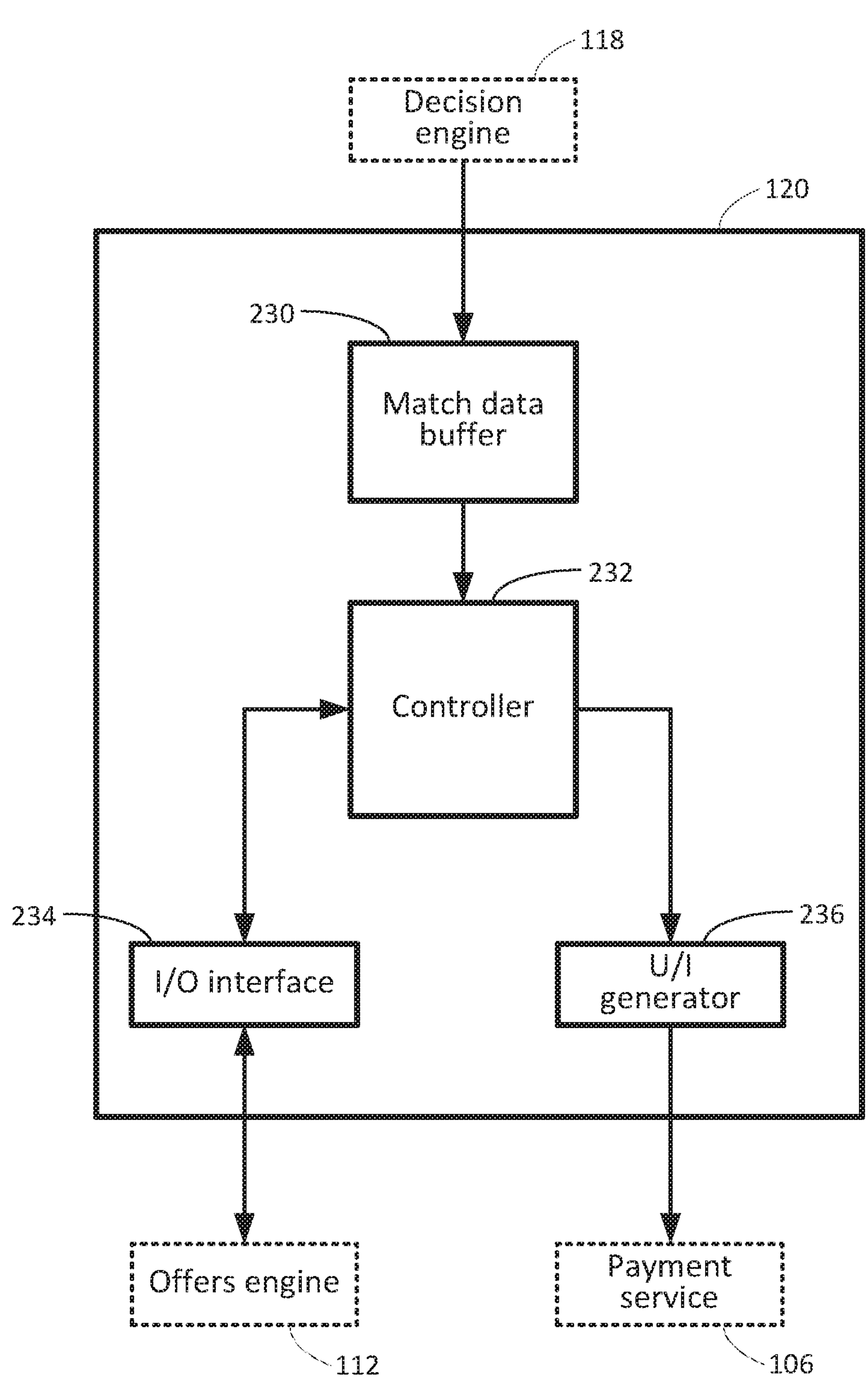
FIG. 5 is a block diagram illustrating an embodiment of an operations module in accordance with the current disclosure.

FIG. 5 illustrates a block diagram of an exemplary operations module 120. The operations module 120, in an embodiment, may be a standalone module that includes a match data buffer 230 that receives transaction data from the decision engine 118. The match data buffer 230 may hold data available for the matching transaction from any or all of the payment service 106, the merchant 104, and the transaction processor 108. The data may include data about the user's login to the payment service 106, a card selection from the payment service 106, and an authorization message from the merchant 104 indicating the success or failure of the transaction. The data may also include a merchant profile, a primary account number of the user, and a country where the primary account is registered. The data may further include an authorization message from the transaction processor 108, a transaction type, an acquirer information, an issuer information, a date and time of the transaction, and an amount of the transaction.

The match data buffer 230 may be coupled to a controller 232 that receives and operates on the data including sending the match data via an input/output (I/O) interface 234 to the offers engine 112. The offers engine 112, as described above, may select one or more rebates, cash back awards, current discount, future discount or others, collectively referred to as offers, in response to the particular transaction. The offers engine 112 may be a rule-based system or may use other heuristics for selecting a particular offer for a specific transaction.

Once the controller 232 receives the offer, the controller 232 may send the data to a user interface (U/I) generator 236. The U/I generator may develop, in real time, presentation code for the offer for use at the user device 102 based on the offer details, the user device operating system, screen size, memory model, etc. The U/I generator 236 may provide the presentation code to the payment service 106 for relaying to the user device 102. In an embodiment, the U/I generator 236 may provide the presentation code directly to the user device 102 via an alternative connection, such as a text message. The presentation code may be HTML code, JavaScript code, or another presentation language appropriate to the user device 102. In another embodiment, the U/I generator may simply provide the offer data to the payment service 106 so that the payment service 106 can perform the generation of the presentation code.

At least one technical effect of the real time matching system 110 is the use of the FIFO buffer 210 under the control of the matching logic 206 to allow precise control of extremely high data traffic volumes in order to identify a single record of interest. In another aspect, the matching algorithm may include self-learning capabilities to be able to continually improve by reviewing large numbers of past transactions to create an algorithm which is technically more accurate and more efficient than previous algorithms.

A system and method in accordance with the current disclosure benefits multiple players associated with payment services. A user receives awards and promotions that may have been lost when a merchant is either unable or unwilling to populate data related to the payment service 106. The operator of the payment service 106 retains the goodwill of the user and increases the brand value of the payment service when transactions are correctly recognized. Lastly, merchants benefit through the user's association of a perquisite from his or her interaction with them merchant. Further, merchants may also receive benefits from supporting a payment service 106 so that correct identification of transactions also allows them to receive the full value of the service.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system comprising:

a transaction processor to:

receive a first data set for a first transaction from a merchant, wherein the first data set comprises a first transaction time; and process a payment based on the first data set; and a real time matching system comprising:

a decision engine comprising:

a first-in first-out (FIFO) buffer for queuing first incoming data for a plurality of transactions from the transaction processor, wherein the first incoming data comprises the first data set for the first transaction;

a FIFO controller for managing data flow in the FIFO buffer;

a payment service event buffer for queuing second incoming data from a payment service, wherein the second incoming data comprises a second dataset for a second transaction initiated at a user device via an interface provided by the payment service, wherein the second dataset comprises a second transaction time; and matching logic to:

determine a time range encompassing the second transaction time;

cause the FIFO controller to obtain a subset of the first incoming data from the FIFO buffer, the subset of the first incoming data corresponding to a subset of the plurality of transactions from the transaction processor having a transaction time within the time range, wherein the subset of the first incoming data comprises the first data set for the first transaction;

access the second data set from the payment service event buffer;

determine the first transaction and the second transaction are the same transaction based on comparing the second transaction time to transaction times associated with the subset of the first incoming data from the FIFO buffer; and match the first data set to the second data set; and an operations module to generate a user interface action for display in real-time, via the interface at the user device during the second transaction, based on the decision engine matching the first data set to the second data set.

2. The system of claim 1, wherein the matching logic implements in hardware a decision tree for determining the first transaction and the second transaction are the same transaction based on the first transaction time and the second transaction time.

3. The system of claim 1, wherein the operations module is to receive match data from the decision engine, and wherein the operations module comprises an interface to an offers engine.

4. The system of claim 3, wherein the operations module comprises an interface to the payment service.

5. The system of claim 1, wherein the FIFO controller is configured to cause the FIFO buffer to provide the subset of the first incoming data to the matching logic based on the determined time range.

6. The system of claim 5, wherein the decision engine further comprises:

a first high-speed interface configured to obtain the first incoming data from the transaction processor and provide the first incoming data to the FIFO buffer; and a second high-speed interface configured to obtain the second incoming data from the payment and provide the second incoming data to the payment service event buffer.

7. The system of claim 6, wherein the decision engine further comprises an output buffer configured to:

obtain and queue the matched the second data set; and provide the matched the second data set to the operations module, wherein the operations module generates the user interface action based on obtaining the matched the second data from the output buffer.

8. The system of claim 5, wherein the matching logic comprises a programmable logic array configured to determine the time determine a time range encompassing the second transaction time, cause a FIFO controller to obtain the subset of the first incoming data, cause the payment service event buffer to provide the second data set, determine the first transaction and the second transaction are the same transaction, and match the first data set to the second data set.

9. A method of cross-matching data from disparate real time database systems, the method comprising:

receiving a first dataset from a payment service at a first high speed data interface of a decision engine, the first dataset related to a transaction initiated by a user at a user device via a user interface provided by the payment service, the first dataset comprising a first transaction time;

queuing, by a payment service event buffer of the decision engine, the first dataset received at the first high speed data interface;

receiving a second dataset from a data processor at a second high speed data interface of the decision engine, the second dataset related to all transactions processed by the data processor;

queuing, by a first-in-first-out (FIFO) buffer of the decision engine, the second dataset received by the second high speed data interface;

determining, by matching logic of the decision engine, a time range encompassing the first transaction time;

causing, by the matching logic, a FIFO controller of the decision engine to obtain a subset of the second dataset from the FIFO buffer, the subset of the second dataset corresponding to transactions processed by the data processor having a transaction time within the time range;

accessing, by the matching logic, the first dataset from the payment service event buffer;

matching, in real time by the matching logic, the transaction initiated by the user described in the first dataset to a corresponding payment transaction processed by the data processor based on comparing the first transaction time to transaction times of the transactions corresponding to the subset of the second dataset provided by the FIFO buffer;

responsive to the matching, sending transaction data from the second dataset corresponding to the payment transaction to an offers engine via an operations module;

receiving from the operations module a record including offer data; and generating, via the operations module, user interface code for execution at the user device during the transaction initiated by the user, the user interface code incorporating the offer data.

10. The method of claim 9, further comprising:

storing the first and second datasets in an activity database.

11. The method of claim 9, further comprising:

sending transaction data from the first dataset to the offers engine via the operations module.

12. The method of claim 11, wherein matching, in real time by the matching logic, the transaction initiated by the user described in the first dataset to the corresponding payment transaction processed by the data processor comprises comparing, by the matching logic, a first transaction time for the transaction initiated by the user described in the first dataset and a second transaction time for the corresponding payment transaction processed by the data processor.

13. The method of claim 12, further comprising:

managing, by the FIFO controller, data flow of the second dataset in the FIFO buffer based on the first transaction time.

14. A real-time matching system, comprising:

a decision engine comprising:

a first-in first-out (FIFO) buffer for queuing first incoming data for a plurality of transactions from a transaction processor, wherein the first incoming data comprises a first dataset for a first transaction and; wherein the first dataset comprises a first transaction time;

a FIFO controller for managing data flow in the FIFO buffer;

a payment service event buffer for queuing second incoming data from the payment service, wherein the second incoming data comprises a second dataset for a second transaction, the second transaction initiated at a user device via an interface provided by the payment service, wherein the second dataset comprises a second transaction time; and matching logic to:

determine a time range encompassing the second transaction time;

cause the FIFO controller to obtain a subset of the first incoming data from the FIFO buffer, the subset of the first incoming data corresponding to a subset of the plurality of transactions from the transaction processor having a transaction time within the time range, wherein the subset of the first incoming data comprises the first data set for the first transaction;

access the second data set from the payment service event buffer;

determine the first transaction and the second transaction are the same transaction based on comparing the second transaction time to transaction times associated with the subset of the first incoming data from the FIFO buffer; and match the first data set to the second data set; and an operations module to generate a user interface action for display in real-time, via at interface at the user device during user engagement associated with the second transaction, based on the decision engine matching the first data set to the second data set.

15. The system of claim 14, wherein the matching logic implements in hardware a decision tree for determining the first transaction and the second transaction are the same transaction based on the first transaction time and the second transaction time.

16. The system of claim 14, wherein the operations module is to receive match data from the decision engine, and wherein the operations module comprises an interface to an offers engine.

17. The system of claim 16, wherein the operations module comprises an interface to the payment service.

* * * * *